United States Patent
Thompson

(10) Patent No.: US 10,958,052 B2
(45) Date of Patent: Mar. 23, 2021

(54) ENCLOSURE FOR PROTECTING ELECTRICAL COMPONENTS, CABLES AND THE LIKE

(71) Applicant: Electrix International Ltd, County Durham (GB)

(72) Inventor: Christopher Thompson, County Durham (GB)

(73) Assignee: Electrix International Ltd

( * ) Notice: Subject to any disclaimer, the term of this patent is extended or adjusted under 35 U.S.C. 154(b) by 40 days.

(21) Appl. No.: 16/158,424

(22) Filed: Oct. 12, 2018

(65) Prior Publication Data

US 2019/0305535 A1    Oct. 3, 2019

(30) Foreign Application Priority Data

Apr. 3, 2018  (GB) ..................................... 1805476

(51) Int. Cl.
| | | |
|---|---|---|
| *H02G 3/08* | (2006.01) | |
| *H02G 3/10* | (2006.01) | |
| *H02G 3/14* | (2006.01) | |
| *F16B 33/00* | (2006.01) | |
| *F16B 37/14* | (2006.01) | |
| *F16B 37/12* | (2006.01) | |

(Continued)

(52) U.S. Cl.
CPC ............. *H02G 3/081* (2013.01); *F16B 5/02* (2013.01); *F16B 33/004* (2013.01);
(Continued)

(58) Field of Classification Search
CPC ............ H02G 3/08; H02G 3/081; H02G 3/14; H02G 3/10; H02G 3/088; H05K 5/00;
(Continued)

(56) References Cited

U.S. PATENT DOCUMENTS 2,512,188 A * 6/1950 Wait ........................ H02G 3/123
248/906
3,673,310 A * 6/1972 Welsh ...................... H02G 3/10
174/58

(Continued)

FOREIGN PATENT DOCUMENTS

| EP | 0991155 | 4/2000 |
|---|---|---|
| WO | WO 02/089280 | 11/2002 |

OTHER PUBLICATIONS

Corresponding Search Report for GB Application No. 1805476.7, dated Aug. 29, 2018. GB.

(Continued)

*Primary Examiner* — Angel R Estrada
(74) *Attorney, Agent, or Firm* — The Belles Group, P.C.

(57) ABSTRACT

An enclosure for protecting electrical components, cables and the like. The enclosure has a plurality of faces which define a volume with an opening to provide access. One face has apertures for receiving fixing screws to fix the enclosure to a wall or surface. There is a lid to close the opening. Spacer members separate the enclosure from the surface. Each has a bore extending through it and a threaded portion extending from a surface of the face which engages the apertured face of the enclosure. For each spacer there is a cap for covering the aperture and sealing the apertured face. Also provided for each spacer is a connecting member fixed to said aperture each having third and fourth threaded portions for respectively engaging first and second threaded portions.

20 Claims, 3 Drawing Sheets

(51) Int. Cl.
    *H02B 1/28* (2006.01)
    *H02B 1/40* (2006.01)
    *F16B 5/02* (2006.01)

(52) U.S. Cl.
    CPC .......... *F16B 37/125* (2013.01); *F16B 37/145* (2013.01); *H02B 1/28* (2013.01); *H02B 1/40* (2013.01); *H02G 3/088* (2013.01); *H02G 3/10* (2013.01); *H02G 3/14* (2013.01)

(58) Field of Classification Search
    CPC ...... H05K 5/02; H05K 5/0217; H05K 5/0247; H05K 5/04; H01R 13/46; H01R 13/52; H01R 13/53; H01R 13/533; H02B 1/40; H02B 1/28
    USPC ....... 174/50, 53, 57, 58, 520, 535, 539, 559, 174/560, 59; 220/3.2–3.9, 4.02; 248/906; 312/223.1
    See application file for complete search history.

(56) References Cited

U.S. PATENT DOCUMENTS

| | | | | |
|---|---|---|---|---|
| 3,919,458 | A | * | 11/1975 | Perrault .................. H02G 3/10 248/906 |
| 4,652,018 | A | | 3/1987 | Boghosian |
| 5,866,853 | A | | 2/1999 | Sheehan |
| 6,852,924 | B2 | * | 2/2005 | Lessard ................ H05K 9/0073 174/50 |
| 7,432,439 | B2 | * | 10/2008 | Takada ................. H01R 9/2425 174/50 |
| 2012/0181402 | A1 | | 7/2012 | Putz et al. |
| 2013/0336743 | A1 | | 12/2013 | Hill |

OTHER PUBLICATIONS

European Search Report for European Application No. 19153621 dated Aug. 6, 2019.

* cited by examiner

Figure 4.
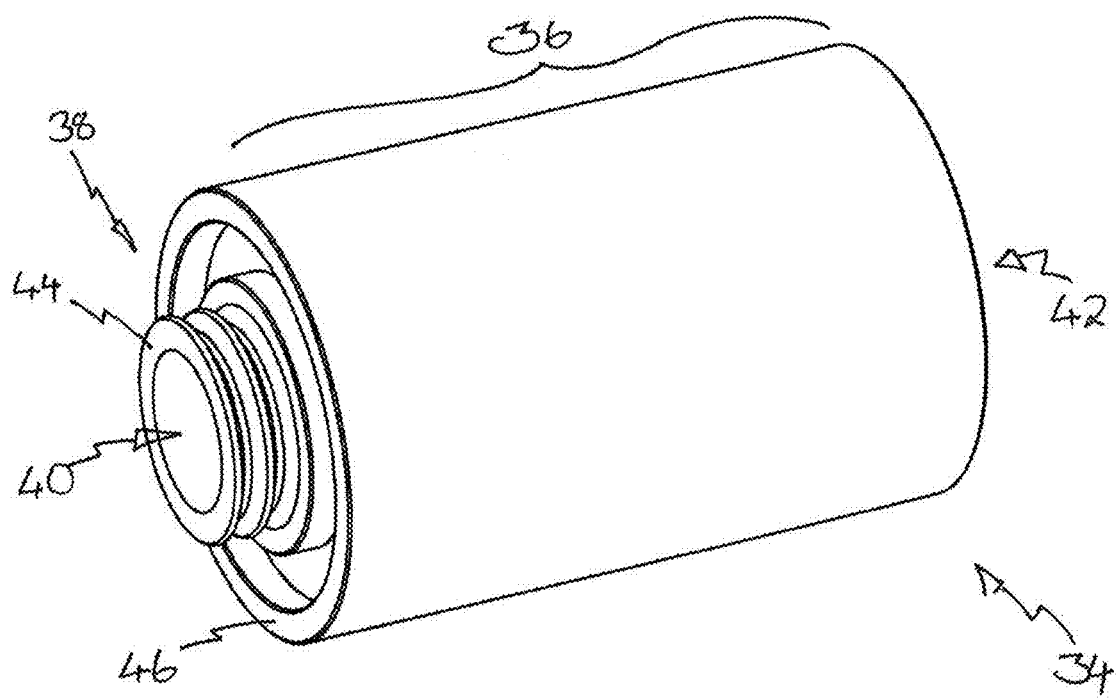
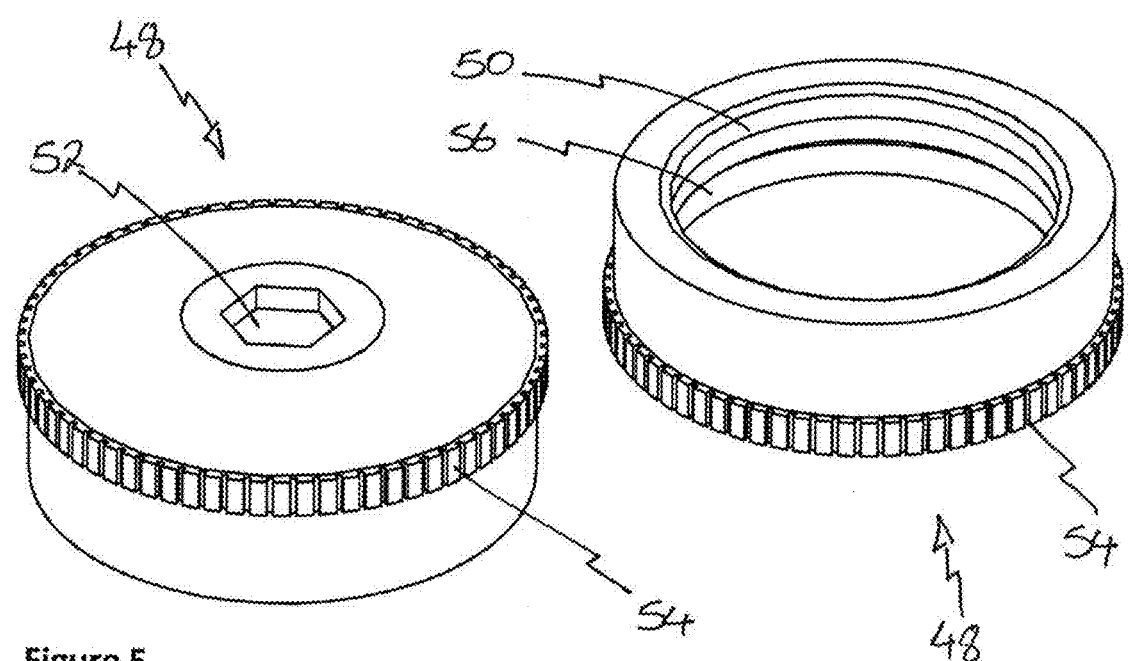
Figure 5.

ENCLOSURE FOR PROTECTING ELECTRICAL COMPONENTS, CABLES AND THE LIKE

CROSS-REFERENCE TO RELATED APPLICATIONS

The application claims priority under 35 U.S.C. § 119 of GB Application No. 1805476.7 filed Apr. 3, 2018. The disclosure of the above application is incorporated herein by reference.

FIELD OF INVENTION

The present invention relates to an enclosure for protecting electrical components, cables and the like and relates particularly, but not exclusively, to a wall mounted enclosure which is spaced from the wall allowing easy access for cleaning the surface onto which the enclosure is mounted.

BACKGROUND

It is commonplace for enclosures to be used to protect electrical components, the cables which connect them as well as the junctions between the components in the cables. Typically, such an enclosure is mounted to a surface, such as a wall, using mounting screws which extend through apertures in the rearmost surface of the enclosure and into the wall. One of the most important protections that the enclosure provides is against water ingress and this is particularly important in environments where cleanliness is a priority. Therefore, the cleaning of the enclosure, and associated components such as conduits and connecting glands, must be an easy and efficient process without risking water entering the enclosure and damaging the components and the like contained therein. To facilitate easy cleaning enclosures are typically formed from stainless steel. The inclusion of the mounting apertures in the rear wall of the enclosure represents a risk of water ingress. As a result, it is not uncommon for a nylon washer to be placed between the fixing screw and the inside of the rear wall of the enclosure to act as a seal. This can be reasonably effective but becomes completely ineffective if the screw becomes loose or is not correctly fixed to the wall to apply sufficient pressure on the washer to create the seal. A loose screw applies no pressure to the washer and therefore does not seal.

For a number of reasons, including easing the cleaning process behind the enclosure, it is commonplace for an enclosure to be mounted on legs thereby separating the enclosure from the surface on which it is mounted. This allows easy access onto the mounting surface and also onto the rear surface of the enclosure. These mounting legs are typically stainless steel tubes having an external diameter of perhaps 2 cm and an internal bore of 6 mm this being sufficient to receive the fixing screw which extends through the tube. However, such legs can increase the risk of water ingress by increasing the number of junctions that need cleaning. The junction between each leg and the enclosure and each leg and the wall each represent a potential access point for water. Although nylon washers can be used to seal between the fixing screw and the rear wall of the enclosure the danger of the integrity of the screw mounting to the wall is increased by the inclusion of the legs. Furthermore, the longer the legs the greater the risk that an impact force against the enclosure will loosen the fixing screw from the wall.

It is also the case that mounting the device with legs can prove difficult as each leg must be held in position whilst being installed. This often results in the installation process becoming a two-person job.

Preferred embodiments of the present invention seek to overcome or alleviate the above described disadvantages of the prior art.

BRIEF SUMMARY

According to an aspect of the present invention there is provided an enclosure for protecting electrical components, cables and the like, the enclosure comprising: a plurality of faces together defining a volume with an opening to provide access to said volume, one of said faces adapted to have a plurality of apertures formed therein for receiving fixing means for fixing said enclosure to a surface; a lid, in use, to close said opening; a plurality of spacer members extending between said apertured face and the surface, said spacer members having a bore extending therethrough and at least one first threaded portion extending from a surface of said spacer member which in use engages said apertured face; a respective plurality of caps for covering said aperture and sealing said apertured face; and a respective plurality of connecting members for said apertures each having third and fourth threaded portions for respectively engaging first and second threaded portions.

By providing an enclosure which includes a plurality of apertures in one face and respective spacer members, caps and connecting members a number of advantages over the prior art have been created. These include the improved waterproofing of the enclosure because the combination of spacer, connecting member and cap ensures that water cannot enter into the volume of the enclosure through the apertures in the rear face of the enclosure. This is because any water entering the spacer members is prevented from entering the enclosure by the combination of the connecting members and the caps. Furthermore, because the connecting members and the spacer members are connected before the enclosure is mounted on the wall the installation process is significantly easier. In particular, by being able to attach each of the spacer members to a respective connecting member, the spacers are all held in place during the mounting process making it easy for one person to install without assistance. It is also the case that by using a threaded portion on the spacer member and this engaging a respective thread on a connecting member the spacer member is effectively fixed to the body of the enclosure thereby increasing the stability of the combination of spacer member and the remainder of the enclosure. This in turn reduces the likelihood of damage occurring to the enclosure by being knocked or bumped once installed.

The enclosure may further comprise at least one first seal in use located between said spacer members and said aperture face. Although not strictly necessary this seal helps to ensure that water cannot access the enclosure by capillary action along the various threads.

The enclosure may also further comprise at least one second seal in use located between said cap and an end of said spacer member adjacent said first threaded. This seal ensures that the cap seal relative to the connecting member.

In a preferred embodiment the aperture face opposes said opening.

In another preferred embodiment at least one of the connecting member is fixed to said aperture surface for example by welding.

In a further preferred embodiment the first and fourth threaded portions are external threads and said second and third threads are internal threads.

BRIEF DESCRIPTION OF THE DRAWINGS

Preferred embodiments of the present invention will now be described, by way of example only, and not in any limitative sense with reference to the accompanying drawings in which:

FIG. 4 is a perspective view of one of the components shown in FIGS. 2 and 3; and FIG. 5 is a perspective view of another component shown in FIGS. 2 and 3.

DETAILED DESCRIPTION

The following description of the preferred embodiment(s) is merely exemplary in nature and is in no way intended to limit the invention, its application, or uses.

Figure 1:
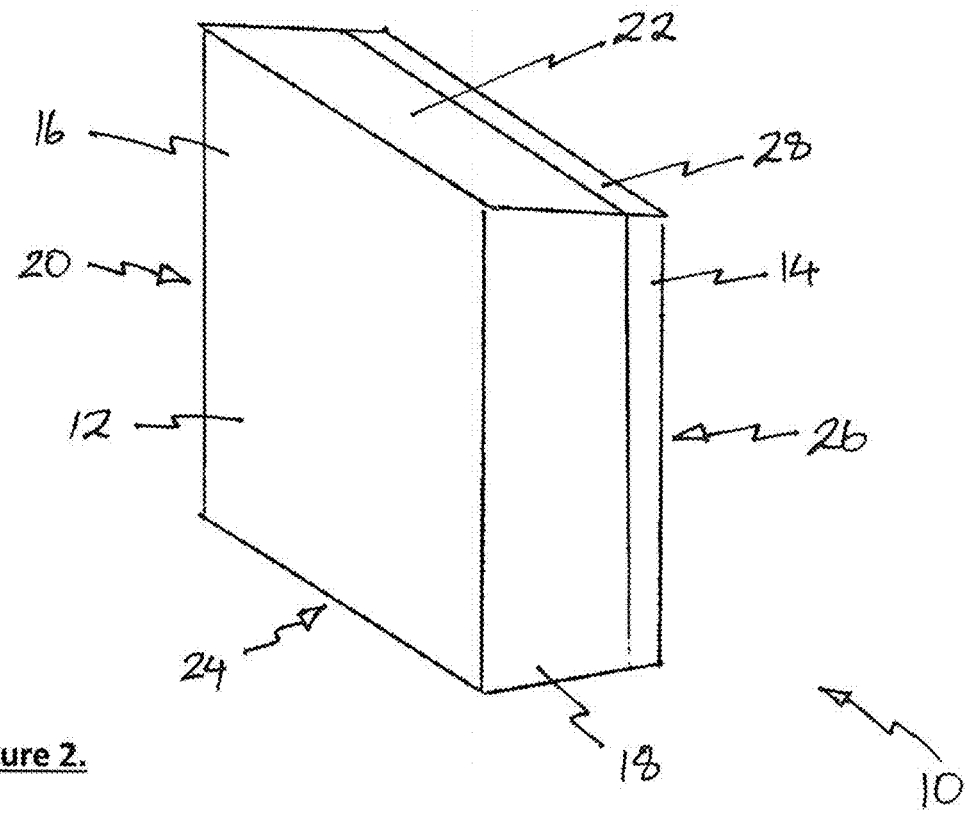
FIG. 1 is a perspective view of a portion of an enclosure of the present invention.

Referring initially to FIG. 1, an enclosure 10 for protecting electrical components, cables and the like includes an enclosure body 12 and a lid 14. The enclosure body 12 is formed from a plurality of faces including a rear face 16, side faces 18 and 20 and top and bottom faces 22 and 24. These five faces together define five sides of a cuboid having an open front face, indicated 26, which therefore defines an open volume. The open front face 26 allows access to the volume of the cuboid body 12 and is closed and sealed by a lid 28 which is fixed to the body 12 using standard fixing means such as bolts extending into threaded recesses, turnbuckles or the like. These components are well-known to persons skilled in the art as forming a standard enclosure and it will be appreciated by such persons that variations on such an enclosure would be easily adapted to operate as part of the present invention. For example, the open face 26 may have a border which engages a flat lid which does not have the edge portions which extend over the top bottom and side faces as seen in FIG. 1.

Figure 2:
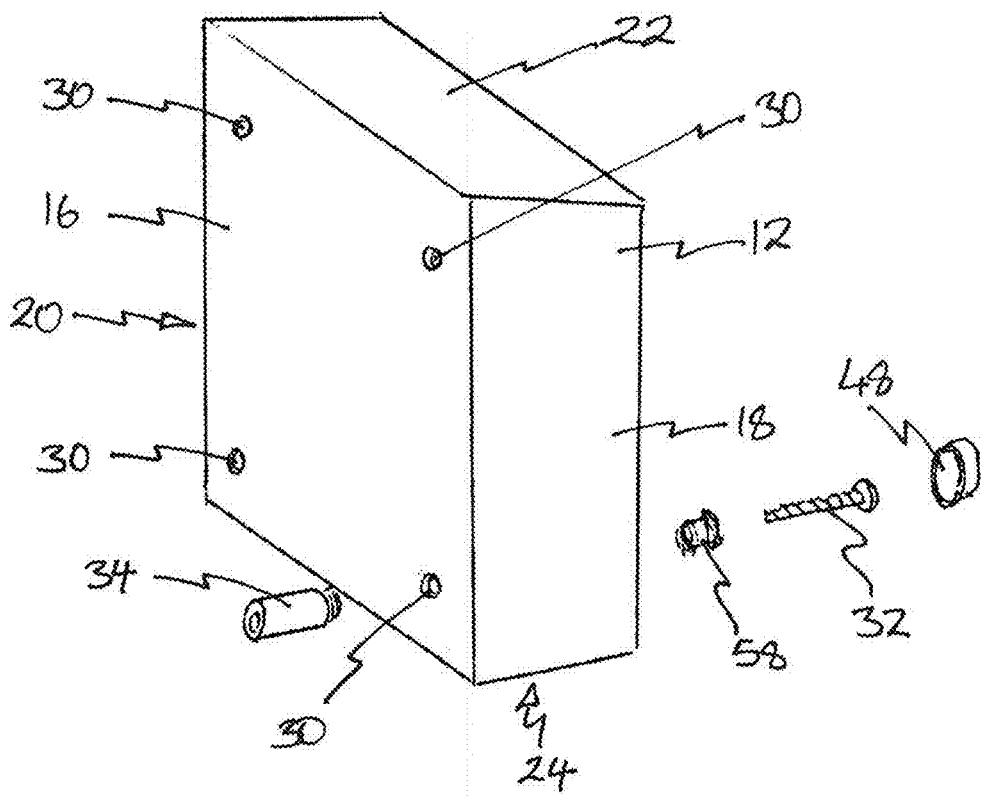
FIG. 2 is a perspective view of the portion of the enclosure of FIG. 1 with further components of the present invention.

Referring additionally to FIG. 2, the enclosure body 12 and specifically the rear face 16 is provided with a plurality of apertures 30. In the embodiment shown in FIG. 2, four apertures 30 have been provided and this is a preferable arrangement with one aperture adjacent each corner of the rectangular rear face 16. These apertures 30 are provided in order to fix the enclosure to a surface such as a wall (not shown) and to do this fixing means, in the form of fixing screws 32, one of which is shown in FIG. 2, are provided. Fixing bolts could be used as an alternative or any suitable fixing means which requires access from the inside surface of the rear face 16.

Figure 3:
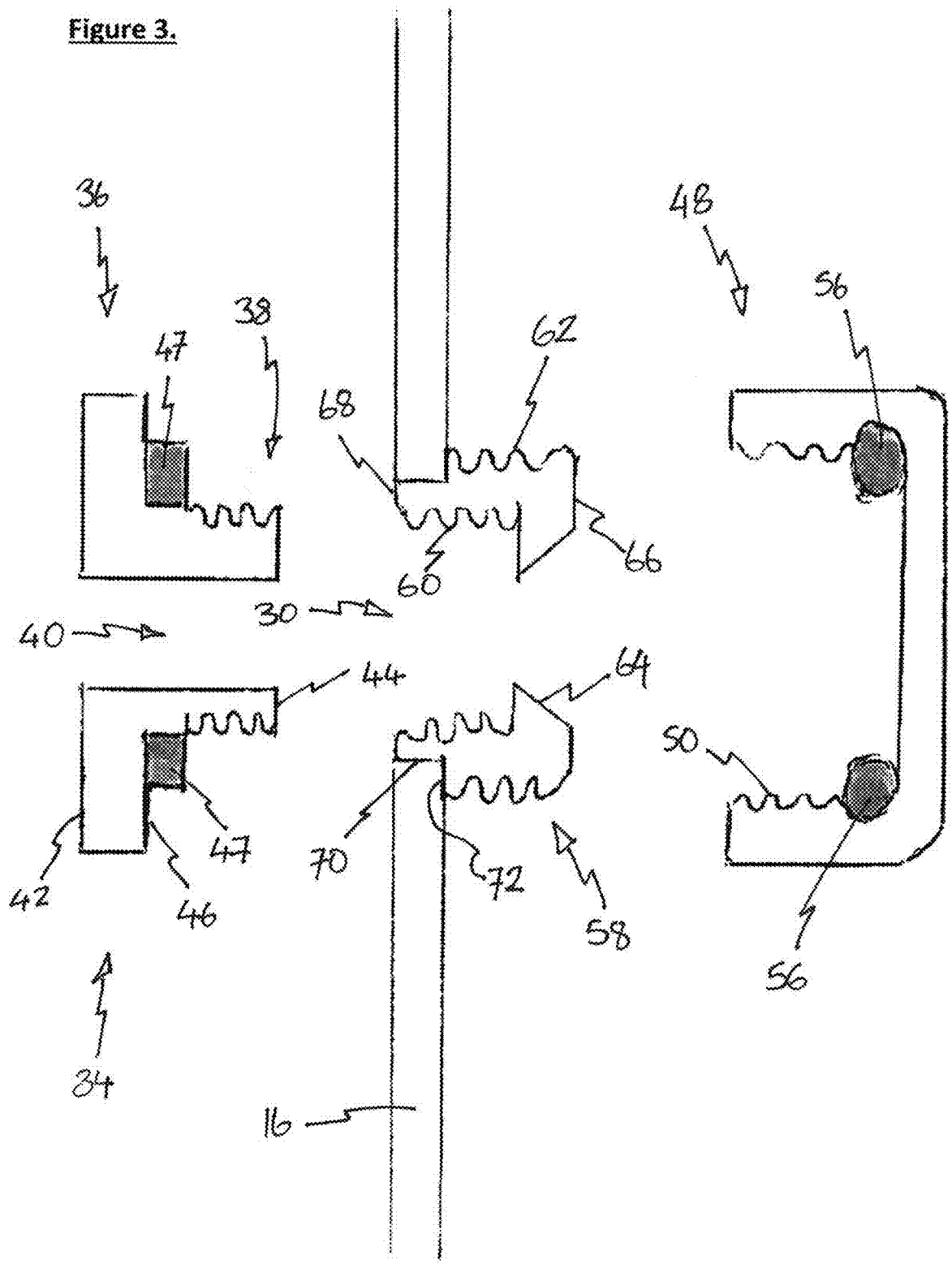
FIG. 3 is a sectional view of a portion of the enclosure and components of FIG. 2.

In order to allow access to the outer surface of the rear face 16 and to the wall surface once the enclosure 10 is mounted, a spacer member 34, in the form of a leg. In the example shown in FIG. 2, only a single spacer member 34 is shown but one is provided respectively for each aperture 30. With additional reference to FIG. 4, each spacer member 34 has a cylindrical body portion 36 and a threaded portion 38 with a bore 40 extending through both the body and threaded portions. A first end 42 of the body portion 36 is located distal of the threaded portion and in use engages the surface onto which the enclosure 10 is mounted. A second end 44 is located on the threaded portion 38 at the opposing end of the spacer 34 from the first end. An intermediate surface 46 is formed because the diameter of the threaded portion 38 is smaller than the body portion 36 and it is preferable, as shown in FIG. 3, that a seal 47 is provided on or to engage the intermediate portion when it engages the outer surface of the apertured rear face 16. In the spacer member 34 shown in FIG. 4, a recess is provided to receive and retain the seal.

Referring to FIGS. 3 and 5, a cap 48 is provided with an internal second thread 50 on the inside of a recess formed in and underneath surface of the cap as shown in FIG. 5. In an opposing upper surface a hexagonal recess 52 is provided to receive an Allen key (not shown) and a knurled outer edge 54 is also provided. At the upper end of the thread 50 a rubber O-ring 56 helps to seal the cap 48 when it is in use.

The final component of the enclosure 10 is a connecting member 58 which in use is located between the spacer member 34 and the cap 48 whilst sitting in the aperture 30. The connecting member 58 comprises an internal third threaded portion 60 which is sized to engage the external threaded portion 38 of spacer member 34. A fourth threaded portion 62 is an external thread sized to engage the internal second thread 50 of the cap 48. The connector member 58 has a counter sunk surface 64 which is sized to engage with the head of fixing screw 32 and extends from a first end surface 66. A second end surface 68, on the opposite side of the connecting member 58, is joined to a third surface 70 which is cylindrical and which in turn connects to a fourth surface 72 which is annular. In use these third and fourth surfaces engage the aperture 30 and in a surface of face 16 adjacent that aperture.

Installation and operation of the enclosure 10 will now be described. If the rear surface 16 has not been provided with the apertures 30 then these are drilled and sized so that the external cylindrical surface 70 of the connecting member 58 engages the internal sides of the aperture 30 as shown in FIG. 3. Once an aperture 30 has been created, the connecting member 58 is inserted into the aperture and the external first thread 38 of the spacer member 34 is engaged with the internal third thread 60 of the connecting member 58. These threads are rotated against each other so that the annular surface 72 of the connecting member presses into engagement with the internal surface of face 16. At the same time the intermediate surface 46 of the spacer member 34 presses the seal 47 into engagement with the second end surface 68 and the external surface of face 16 which meet at the cylindrical surface 70 where it engages the internal surface of the aperture 30. The compression of the seal 47 ensures that no water can get between the cylindrical surface 70 and the internal surface of aperture 30 or along the junction between the first threaded portion 38 and second thread 60. This also acts to hold the spacer member 34 in position so that the fixing screw 32 can extend through the aperture 30 and along the bore 40 into a hole drilled in the wall onto which the enclosure is mounted and therefore fix the enclosure to that wall. This fixing using the fixing screws 32 takes place after each of the spacer members 34 and connecting members 58 have been engaged with their respective apertures 30. Once the enclosure is mounted the caps 48 can be located onto the connecting members 58 to cover the heads of the fixing screws 32. This is achieved by engaging the internal second thread 50 with the fourth external thread 62 and initially tightening by hand using the knurled edge 54. To ensure proper sealing an Allen key is inserted into the hexagonal recess 52 and the threads further tightened against each other so that the first end surface 66 compresses the O-ring seal 56 into engagement with the innermost surface of the cap 48. It is now impossible for any water to pass up the bore 40 and enter the enclosure via that route. To complete the enclosure the lid 14 is located onto the enclosure body 12 and locked into place using whatever locking means has been provided.

It will be appreciated by persons skilled in the art that the above embodiment has been described by way of example only and not in any limitative sense, and that various alterations and modifications are possible without departure from the scope of the protection which is defined by the appended claims. For example, the length of the body portion 36 of spacer 34 can be anything suitable from a few millimetres (as seen in FIG. 3) to several centimetres as seen in FIGS. 2 and 4). In the embodiment shown the opening 26 is on the opposing side of the cuboid forming the main body of the enclosure from the apertured face 16. This need not always be the case if fixing in an alternative direction is required. However, it would make installation of the enclosure more complicated. Furthermore, the enclosure 10 can be any form of electrical enclosure and may include electrical components, such as switches, extending through the surface of the lid. Other types of enclosure include, but are not limited to, trunking which has open ends which connect to each other to form an elongate enclosure once installed. It is also the case that the apertures 30 may be pre-drilled into the required face of the enclosure body and in which case it may be desirable to fix the connecting portions 58 into the apertures 30 by for example welding. In a further alternative it is possible to reverse the internal and external threads. For example, the spacer member could be provided with an internal thread which engages an external thread on one side of the connecting member which in turn has an internal thread on its other side which engages an external thread on the cap. Other thread combinations could also be provided. However, these arrangements are less desirable than that previously described and shown in the drawings.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. An enclosure for protecting electrical components, cables and the like, the enclosure comprising:
   a plurality of faces together defining a volume with an opening to provide access to said volume, one of said faces adapted to have a plurality of apertures formed therein to form an apertured face for receiving a fixing device for fixing said enclosure to a surface;
   a lid, in use, to close said opening;
   a plurality of spacer members extending between said apertured face and the surface, said spacer members having a bore extending therethrough and at least one first threaded portion extending from a surface of said spacer member which in use engages said apertured face;
   a respective plurality of caps for covering said aperture and sealing said apertured face and comprising a second threaded portion; and
   a respective plurality of connecting members for said apertures each having third and fourth threaded portions for respectively engaging said first and second threaded portions.

2. An enclosure according to claim 1 further comprising at least one first seal in use located between said spacer members and said apertured face, said first seal being compressed between said spacer members and said apertured face to prevent liquid from passing into said volume between said connecting members and said apertured face.

3. An enclosure according to claim 1 further comprising at least one second seal in use located between said cap and an end of said connecting member adjacent said second threaded portion.

4. An enclosure according to claim 1 wherein said apertured face opposes said opening.

5. An enclosure according to claim 1 wherein at least one said connecting member is fixed to said apertured surface.

6. An enclosure according to claim 5 wherein at least one said connecting member is welded to said apertured surface.

7. An enclosure according to claim 1 wherein said first and fourth threaded portions are external threads and said second and third threaded portions are internal threads.

8. An enclosure according to claim 1 wherein each of said connecting members comprises a first end surface located within the volume and a counter sunk surface extending obliquely from the first end surface towards an axis of the connecting member and towards a second end surface of the connecting member which is opposite the first end surface, and wherein an end of the counter sunk surface which is furthest from the first end surface is positioned closer to the axis than the third threaded portion.

9. An enclosure according to claim 8 wherein each of the connecting members comprises an inner surface which forms the third threaded portion and an outer surface which forms the fourth threaded portion, and further comprising an annular shoulder extending from the end of the counter sunk surface which is furthest from the first end surface of the connecting member to the inner surface of the connecting member, the annular shoulder being perpendicular to the axis.

10. An enclosure according to claim 1 wherein each of the connecting members comprises an inner surface which forms the third threaded portion and an outer surface which forms the fourth threaded portion, the inner surface surrounding a through-hole through which the fixing device is configured to extend for fixing said enclosure to said surface, the through-hole extending along an axis, and further comprising an annular shoulder extending from an end of the threaded portion towards the axis in a direction perpendicular to the axis.

11. An enclosure according to claim 10 wherein each of the connecting members further comprises a first end surface located within the volume, a second end surface opposite the first end surface, and a countersunk surface extending directly between the shoulder and the first end surface, the shoulder and the first end surface both being perpendicular to the axis.

12. An enclosure for protecting electrical components, the enclosure comprising:
   an enclosure body comprising a rear wall and one or more sidewalls extending from the rear wall to a distal end which defines an opening into a cavity;
   a plurality of apertures extending through the rear wall from a rear surface of the rear wall to a front surface of the rear wall, the front surface of the rear wall forming a floor of the cavity;

a plurality of connecting members each at least partially positioned within one of the apertures, each of the connecting members comprising a first end surface, a second end surface, an inner threaded surface which defines a through-hole having an axis, and an outer threaded surface;

a plurality of spacer members each having a first end which is configured to abut against a surface upon which the enclosure is to be mounted, a second end opposite the first end, a bore extending from the first end to the second end, and a threaded portion comprising an outer threaded surface, the outer threaded surface of each of the spacer members matingly engaged with the inner threaded surface of one of the connecting members to couple the spacer member to the connecting member;

a plurality of screws, each of the screws comprising a threaded portion which is configured to extend through the through-hole of one of the connecting members and the bore of one of the spacer members to mount the enclosure to the surface; and a plurality of caps, each of the caps having an inner threaded surface which is matingly engaged with the outer threaded surface of one of the connecting members to couple the cap to the connector member, each of the caps covering a head of the screw which is inserted into the connecting member that is engaged with the cap.

13. The enclosure according to claim 12 wherein the second end of each of the connecting members is flush with or recessed relative to the rear surface of the rear wall.

14. The enclosure according to claim 12 wherein each of the connecting members comprises an annular flange surface which abuts against the front surface of the rear wall.

15. The enclosure according to claim 12 wherein each of the spacer members comprises a body portion comprising the first end of the spacer member and an intermediate surface, the threaded portion extending from the intermediate surface of the body portion to the second end of the spacer member, and further comprising a seal positioned on the intermediate surface and surrounding a portion of the threaded portion so that when the spacer member is coupled to the connector member the seal is compressed against the rear surface of the rear wall of the enclosure body to prevent water from passing between the connector member and the enclosure body and into the cavity.

16. The enclosure according to claim 12 wherein each of the caps comprises an end wall and a sidewall, the sidewall comprising the inner threaded surface which comprises threads, and further comprising an O-ring positioned within an interior of the cap between an upper end of the threads of the inner threaded surface and the end wall, the O-ring engaging the connection member when the cap is coupled to the connection member to prevent water from passing into the cavity through the through-hole of the connector member.

17. The enclosure according to claim 12 further comprising a lid for closing the opening into the cavity formed at the distal end of the one or more sidewalls.

18. The enclosure according to claim 12 wherein each of the connecting members comprises a countersunk surface extending obliquely from the first end surface in a direction towards the axis and an annular shoulder extending from an end of the countersunk surface which is furthest from the first end surface to the inner threaded surface in a direction perpendicular to the axis, the end of the countersunk surface which is furthest from the first end surface being located closer to the axis than the inner threaded surface.

19. The enclosure according to claim 18 wherein for each of the connecting members, the first end surface extends directly between the countersunk surface and the outer threaded surface.

20. An enclosure for protecting electrical components, the enclosure comprising:

an enclosure body comprising a rear wall and one or more sidewalls extending from the rear wall to a distal end which defines an opening into a cavity;

a plurality of apertures extending through the rear wall from a rear surface of the rear wall to a front surface of the rear wall, the front surface of the rear wall forming a floor of the cavity;

a plurality of connecting members each at least partially positioned within one of the apertures, each of the connecting members comprising an inner threaded surface which defines a through-hole and an outer threaded surface;

a plurality of spacer members each comprising a body portion, a threaded portion comprising an outer threaded surface, and a bore, the outer threaded surface of each of the spacer members matingly engaged with the inner threaded surface of one of the connecting members to couple the spacer member to the connecting member;

a first seal disposed around a portion of the threaded portion of each of the spacer members, the first seal being pressed into engagement with the rear surface of the rear wall and compressed when the spacer members are coupled to the connecting members to prevent water from passing into the cavity in a space between the connecting members and the enclosure body; and a plurality of caps, each of the caps having an inner threaded surface which is matingly engaged with the outer threaded surface of one of the connecting members to couple the cap to the connector member.

* * * * *